July 11, 1933.   I. BENCOWITZ   1,917,693
PRODUCTION OF SULPHUR DIOXIDE
Filed July 16, 1931   2 Sheets-Sheet 1
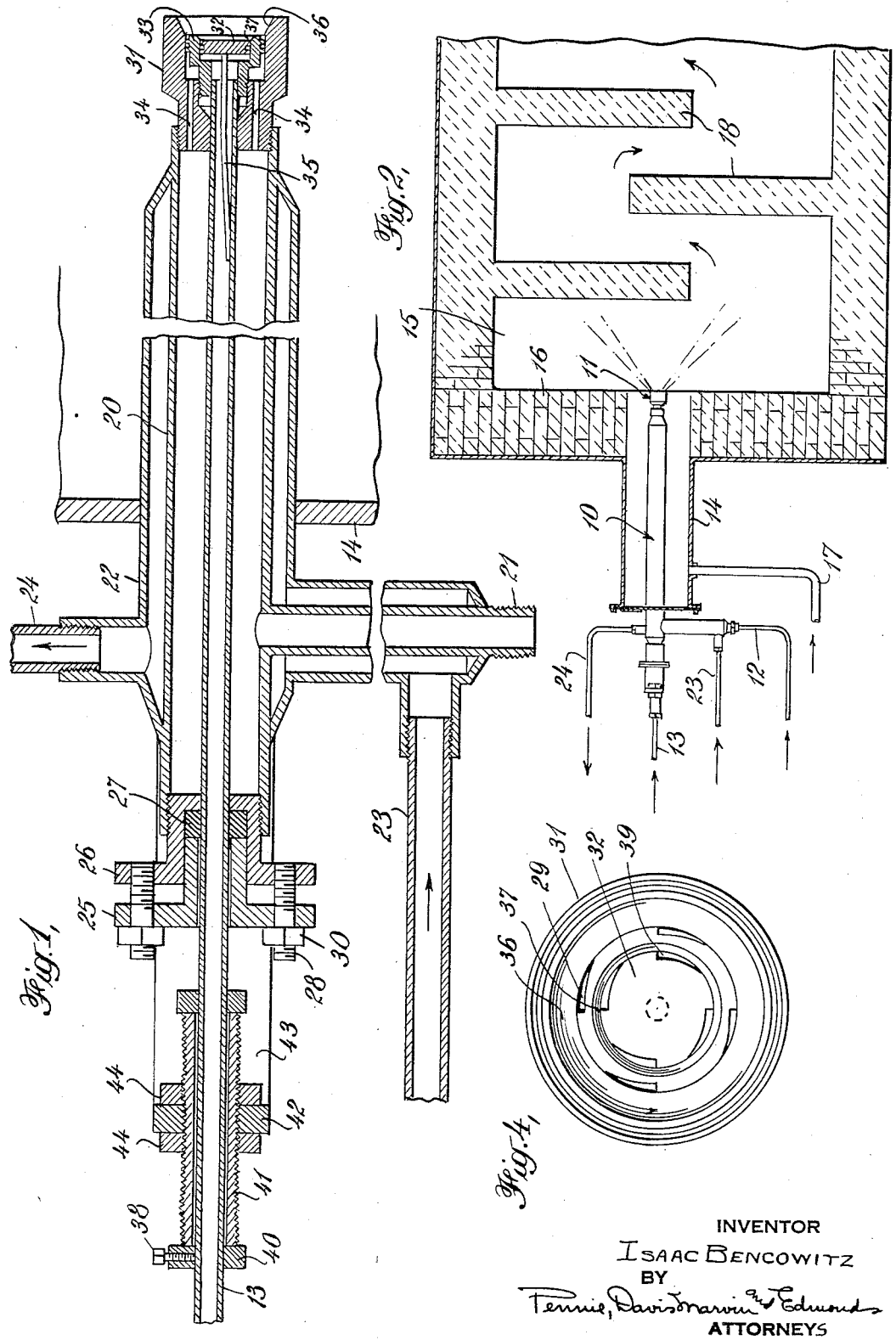
INVENTOR
ISAAC BENCOWITZ
BY
Pennie, Davis, Marvin & Edmonds
ATTORNEYS

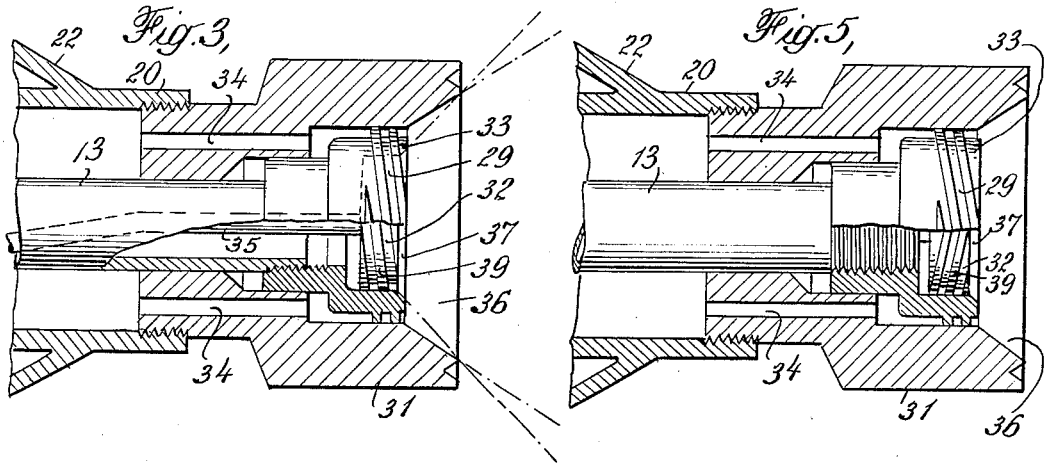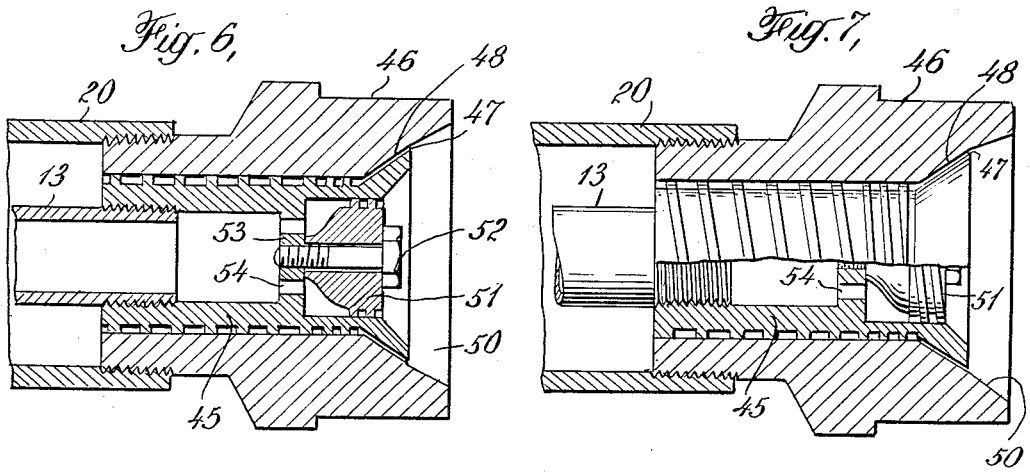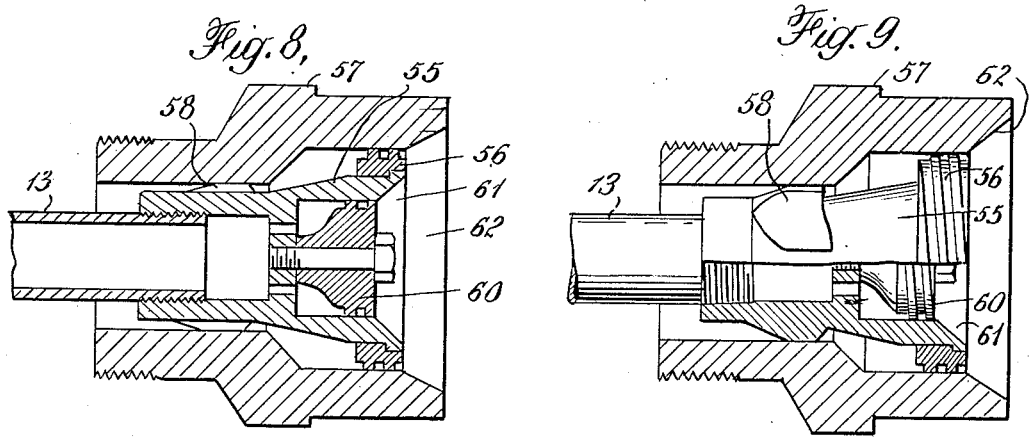

Patented July 11, 1933

1,917,693

UNITED STATES PATENT OFFICE

ISAAC BENCOWITZ, OF NEW YORK, N. Y., ASSIGNOR TO TEXAS GULF SULPHUR COMPANY, A CORPORATION OF TEXAS

PRODUCTION OF SULPHUR DIOXIDE

Application filed July 16, 1931. Serial No. 551,194.

This invention relates to sulphur dioxide production and has for an object the provision of an improved method for treating elemental sulphur to produce sulphur dioxide-bearing gases.

Sulphur dioxide for use in various industrial operations such, for example, as sulphite pulp processes is generally produced by subjecting elemental sulphur to the action of air or other oxygen containing gases at elevated temperatures. In producing sulphur dioxide from elemental sulphur by means of the heretofore customary processes, considerable difficulty has been encountered in avoiding the production of gases containing, in addition to sulphur dioxide, sulphur trioxide and sublimed sulphur. These substances frequently produce harmful results in processes in which sulphur dioxide-bearing gases are employed, and their presence in the gaseous product of a sulphur burning operation is generally undesirable.

The heretofore customary processes are incapable of being so conducted as to produce sulphur dioxide-bearing gas which is uniformly substantially free from sulphur trioxide and sublimed sulphur and which, at the same time, contains a suitably high percentage of sulphur dioxide. The production of gases of fair quality with respect to sulphur dioxide concentration and content of undesirable components by means of the heretofore customary processes requires the use of relatively large amounts of complicated apparatus which demand constant care and attention during the course of its operation.

The present invention provides a process by means of which gases of substantially uniform composition and high quality with respect to sulphur dioxide concentration and content of undesirable components may be produced. In carrying out the process of the invention, apparatus of simple and rugged construction may be employed to accomplish high-capacity production.

The process of the invention involves the formation of a spray of finely divided or atomized sulphur under conditions which will promote the production of an intimate mixing of the sulphur with an oxidizing gas. The spray may be produced in any suitable manner and oxygen for combining with the sulphur may be provided in any suitable manner.

According to the preferred process of the invention a current or blast of high pressure air or other oxidizing gas is directed against a stream of molten sulphur, and the resulting intimate mixture is passed through a suitable combustion chamber in which a temperature sufficiently high to promote a reaction between sulphur and oxygen is maintained. All of the oxygen required for the combustion of the sulphur may be provided by means of the current of gas employed for producing the spray, but, in forming the spray, I prefer to employ just sufficient gas to effect suitable subdivision of the sulphur and to provide any additional oxygen which may be required by introducing a current of oxygen-containing gas into the combustion chamber against or at a point adjacent to the resulting spray.

I have found that molten sulphur may be subdivided or atomized very effectively by directing a whirling current of high pressure gas against a stream of the molten sulphur. A whirling current of high pressure air may be employed to produce a spray comprising an intimate mixture of finely divided or atomized sulphur and air. Any suitable type of stream of molten sulphur may be employed, but it is desirable to form a stream of molten sulphur which offers a large surface for contact with the spray producing gas current.

Any suitable type of apparatus comprising a combustion chamber and means for introducing a spray of finely divided or atomized sulphur into the combustion chamber may be employed in carrying out the process of the invention. In the preferred form of apparatus for carrying out the process of the invention, means are provided for directing a stream of high pressure gas such as air against a stream of molten sulphur in order to form the spray of finely divided or atomized sulphur. The air or other gas is preferably directed against the stream of sulphur in the form of a whirling current of high velocity. When air is employed for forming the spray of atomized sulphur, the amount employed is preferably insufficient to completely oxidize the sulphur to sulphur dioxide, the remainder of the required air being introduced into the combustion chamber separately.

The spray forming apparatus may comprise means for imparting whirling movements to both the molten sulphur and the gas employed in forming the spray. Thus, for example, the molten sulphur and the air or other gas may be passed through separate passages provided with worm threads adjacent their discharge ends. The preferred form of spray forming apparatus comprises a nozzle mounted on the adjacent ends of a pair of telescoping tubes or conduits and comprising telescoping worm screws. The spaces between the worm threads communicate with the passage in the inner tube and a passage formed between the two tubes. Means are provided for introducing air or other gas and sulphur into the inner tube and the passage between the tubes. Air or other gas supply means are preferably connected to the inner tube, and the construction of the nozzle is preferably such that whirling currents of air and sulphur are produced, the whirling current of air being formed interiorly of the whirling current of sulphur and crossing the path of the whirling current of sulphur beyond its point of formation. The construction of the nozzle may be such that the whirling masses rotate in the same direction or it may be such that the whirling masses rotate in opposite directions.

The accompanying drawings show apparatus which may be employed for carrying out the process of the invention. The apparatus shown and described herein is claimed in my copending application Serial No. 551,193, filed July 16, 1931. In the accompanying drawings, Fig. 1 is a sectional elevation showing spray forming apparatus constructed in accordance with the invention;

Fig. 2 shows the apparatus of Fig. 1 applied to a combustion chamber;

Fig. 3 is a sectional view of the nozzle of the apparatus shown in Fig. 1;

Fig. 4 is an end view of the nozzle shown in Fig. 3;

Fig. 5 is a sectional view of a nozzle similar to that shown in Fig. 3 but in which the inner and outer worms are oppositely threaded;

Figs. 6 and 8 are longitudinal sections of modified forms of nozzles; and

Figs. 7 and 9 are sectional views showing additional features of the nozzles shown in Figs. 6 and 8, respectively.

The apparatus illustrated in the drawings comprises a spray device 10 provided adjacent one end with a nozzle 11 and adjacent the other end with conduits 12 and 13 for the introduction of molten sulphur and high pressure air, respectively, from suitable sources of supply (not shown).

The spray device 10 projects through a casing 14 communicating with an opening in an end wall 16 of a combustion chamber 15 to a point adjacent the inner surface of the end wall. The casing 14 provides a passage for the introduction of air into the combustion chamber around a spray issuing from the nozzle 11. The casing is connected with a low-pressure fan or blower (not shown) by means of a conduit 17. The combustion chamber may be of any suitable length, and it is provided with a series of staggered baffles 18 which cooperate to provide a tortuous path of travel for gases passing therethrough. Any suitable means may be provided for withdrawing sulphur dioxide-bearing gases from the combustion chamber.

The spray device comprises an inner tube which forms a continuation of the conduit 13 and an outer tube 20 of greater diameter than the inner tube telescoping with the inner tube and mounted in axial alignment therewith, the walls of the inner and outer tubes being spaced apart to provide an annular passage therebetween. A short conduit 21 communicates with the passage between the tubes and with the supply conduit 12 to provide an inlet for molten sulphur. The major portions of the outer tube 20 and the sulphur supply conduit 21 are surrounded by a steam jacket 22 provided with inlet and outlet conduits 23 and 24 which are connected to suitable steam supply and exhaust means (not shown).

The opposite ends of the outer tube are threaded internally to receive threaded end portions of a gland and the nozzle 11. The gland is of usual construction, comprising centrally bored male and female members 25 and 26 and an annular relatively soft packing element 27. Stud bolts 28 and nuts 30 are provided for maintaining the male and female members of the gland in properly adjusted positions. The gland provides a seal for one end of the annular space between the inner and outer tubes.

The nozzle 11 comprises an outer substantially tubular or hollow casing 31 and telescoping quadruple worm screws 32 and 33. The central opening through the nozzle casing is formed in three sections having different diameters, the inner surfaces of each section being of substantially cylindrical forms. The diameter of the smaller section is such as to permit the insertion of the air supply conduit 13 and provide a substantially fluid-tight joint. The diameter of the intermediate section is such as to provide for the reception of a reduced end portion of the outer worm screw 33. A substantially fluid-tight joint is formed between the reduced end portion of the outer worm screw and the inner surface of the intermediate section of the nozzle casing. The peripheral surfaces of the worm threads on the outer worm screw 33 engage the inner surface of the larger end section of the nozzle casing. The wall of the nozzle casing is provided with longitudinal passages 34 providing means of communication between the spaces 29 between the threads of the outer worm screw and the annular passage between the inner and outer tubes 13 and 20.

The outer worm screw is hollow, and the opposite end portions of the passage therethrough are of different diameters, the portion of smaller diameter extending through the reduced end portion of the worm screw and being threaded to engage a threaded end portion of the inner tube 13. The inner worm screw 32 is mounted within the larger end portion of the outer worm screw with the peripheral surfaces of the worm threads in substantial engagement with the inner surface of the outer worm screw.

In the assembled apparatus, the outer worm screw is mounted on and held in position by the inner air tube 13. The inner worm screw is held in position by means of a rod 35 attached thereto and to the wall of the inner air tube.

The discharge end edges of the nozzle casing and the outer worm screw are beveled internally to provide surfaces 36 and 37 for controlling the direction of travel of the separate fluid streams issuing from the passages between the worm threads. The inner worm screw is so mounted with respect to the outer worm screw that the end faces of the threads thereon lie in a plane containing the inner end edge of the beveled surface 37 of the outer worm screw. In the operation of the apparatus, the position of the outer worm screw is preferably so adjusted that the end faces of the worm threads thereon lie in a plane containing the inner end edge of the beveled surface 36 of the nozzle casing. As shown, for example, in Fig. 3, the beveled surfaces 36 and 37 are so disposed that the path of travel of air issuing from the spaces 39 between the worm threads of the inner worm screw will cross the path of travel of molten sulphur issuing from the spaces 29 between the worm threads of the outer worm screw.

The inner air tube 13 and the worm screws mounted thereon are locked in their proper operative positions with respect to the nozzle casing by means of a set screw 38 extending through a threaded opening in a collar 40 which forms part of a hollow externally threaded adjusting member 41 through which the air tube 13 extends. The adjusting member 41 extends through a threaded opening in the transverse portion 42 of a yoke having a pair of longitudinally extending arms 43 rigidly attached at their ends to the outer tube 20. Lock nuts 44 are provided on opposite sides of the member 42 for locking the adjusting member in its adjusted positions. Rough adjustments may be made by sliding the air tube longitudinally, and the finer adjustments may be made by rotating the adjusting member 41 after the air tube has been locked against relative movement by means of the set screw 38.

The nozzle illustrated in Fig. 5 is identical with the nozzle illustrated in Figs. 1, 3 and 4 except that the inner worm screws of the two nozzles are threaded oppositely. Masses of two different fluids issuing from a nozzle of the type illustrated in Fig. 5 will rotate in opposite directions, while masses of two different fluids issuing from a nozzle of the type illustrated in Figs. 1, 3 and 4 will rotate in the same direction.

The nozzle illustrated in Figs. 6 and 7 is provided with a relatively long hollow outer worm screw 45. Worm threads of different lengths are provided. Two worm threads extend the entire length of the worm screw, and two shorter worm threads are disposed between the long threads on the discharge end portion of the worm screw. The inlet end portion of the nozzle is thus provided with two passages and the discharge end portion with four passages for the flow of molten sulphur between the outer worm screw and the nozzle casing 46. The discharge end portion of the outer worm screw is flared outwardly to provide a frusto-conical surface 47 which is disposed adjacent a similar surface 48 formed internally on the discharge end portion of the nozzle casing. The internal surface of the discharge end portion of the nozzle casing is beveled at two different angles to provide two different contiguous, axially aligned, frusto-conical surfaces 48 and 50 the elements of the outermost one of which (50) form the smaller angles with the common axis. The inner surface of the discharge end portion of the outer worm screw is beveled to provide a frusto-conical surface in axial alignment with the frusto-conical surfaces 47, 48 and 50 and the elements of which form greater angles with the common axis than the elements of the surface 50. The inner worm screw 51, the outer worm screw 45 and frusto-conical surface 50 are so disposed relatively to one another that the path of travel of fluid issuing from the spaces between the worm threads of the inner worm screw will cross the path of travel of fluid issuing from the spaces between the worm threads of the outer worm screw.

The inner worm screw 51 is held in position within the outer worm screw by means of a bolt 52 extending centrally therethrough and having a threaded end portion which enters a threaded opening in a wall 53 within and formed integrally with the outer worm screw. The wall 53 is provided with openings 54 which provide means of communication between the inlet and discharge end portions of the outer worm screw.

The nozzle illustrated in Figs. 8 and 9 combines several features of the nozzles illustrated in the remaining figures. The outer worm screw 55 is provided with a removable ring 56 on which the worm threads are formed. The inlet end portion of the outer worm screw is spaced from the wall of the nozzle casing 57 by means of paced projection 58 formed integrally therewith. The inner worm screw 60 is similar to the inner worm screw of the nozzle shown in Figs. 6 and 7, and it is mounted within the outer worm screw in a similar manner. Frustroconical surfaces 61 and 62 are provided for directing the travel of fluids issuing from the nozzle.

In employing apparatus of the type illustrated for carrying out the process of the invention, molten sulphur under any suitable pressure is introduced into the passage between the inner tube 13 and the outer tube 20 through the conduits 12 and 21 and flows longitudinally therethrough toward the discharge nozzle. Upon entering the discharge nozzle, the direction of flow is changed by the worm threads and the molten sulphur issues from the discharge nozzle in the form of a whirling stream. High pressure air, introduced into the inner tube 13, flows longitudinally therethrough until it reaches the discharge nozzle wherein its direction of flow is changed by the worm threads and it issues from the discharge nozzle as a whirling current. The relatively high-velocity whirling current of air upon striking the relatively low-velocity stream of molten sulphur produces a whirling spray comprising an intimate mixture of air and finely divided sulphur. The heat developed through oxidation of the sulphur during the course of the operation is sufficient to maintain the combustion chamber at a temperature sufficiently high to cause rapid oxidation of the suphur continuously. The amount of air introduced through the inner air tube 13 should be just sufficient to result in the production of a suitable whirling spray. Additional air for completing the oxidation of the sulphur to sulphur dioxide is introduced into the combustion chamber around the spray through the conduit 17 and the casing 14.

The various nozzles illustrated may be used interchangeably in apparatus of the type illustrated in Figs. 1 and 2. Nozzles of any suitable sizes may be employed. Nozzles having dimensions substantially the same as those of the nozzles illustrated in the drawings have been employed successfully. Employing apparatus provided with one of such nozzles, I have succeeded in burning sulphur at the rate of three and one-half to ten tons per day to produce a gas running consistently 19% to 21% sulphur dioxide. The gas leaving the combustion chamber was practically colorless showing a low content of sublimed sulphur. The apparatus which was capable of being operated to burn efficiently three and one-half to ten tons of sulphur per day was also capable of being regulated to burn efficiently as little as a few pounds of sulphur per hour.

The flexibility of the apparatus with respect to capacity may be attributed to the fact that the success of the operation is not dependent upon the pressure or volume of the molten sulphur provided. The primary factor in producing the finely divided spray is the air or other gas employed. I have found it to be advisable to employ a gas such as air under a pressure of about forty to eighty pounds per square inch. In the process of the invention, the desired type of spray is obtained primarily as a result of the use of high pressure air or other oxidizing gas and the efficiency of the apparatus is due not only to the fine subdivision of the sulphur but also to the intimacy with which the air or other oxidizing gas and the sulphur leaving the nozzle are mixed.

Molten sulphur for use in carrying out the process of the invention may be produced in any suitable manner. Heat for melting the sulphur may be obtained from the gases leaving the combustion chamber by means of suitable heat exchanging apparatus (not shown).

In order to obtain the optimum results in carrying out the process of the invention, it is advisable to employ dry air or air of low water content and to regulate carefully the relative amounts of sulphur and oxygen admitted to the combustion chamber. Water and excess free oxygen tend to promote the production of sulphur trioxide at elevated temperatures. Air for use in carrying out the process of the invention may be dried by means of sulphuric acid, and suitable drying apparatus may be provided as a part of the complete apparatus for carrying out the process of the invention. Such apparatus may comprise, for example, a packed tower through which air and sulphuric acid may be passed in countercurrent relationship. The gases issuing from the combustion chamber may be cooled to reduce the tendency of the sulphur dioxide to react with free oxygen and water vapor which may be associated therewith. Such cooling means may be a heat exchanger in which the heat removed from the gases may be employed for melting elemental sulphur for use in the process.

I caim:—

1. In a process for producing sulphur dioxide, the step which comprises directing a whirling current of a high pressure oxygen-containing gas against a stream of molten sulphur to produce a spray comprising an intimate mixture of finely divided sulphur and oxygen.

2. In a process for producing sulphur dioxide, the step which comprises directing a whirling current of a high pressure oxygen-containing gas against a whirling stream of molten sulphur to produce a spray comprising an intimate mixture of finely divided sulphur and oxygen.

3. The method of producing sulphur dioxide which comprises directing a whirling current of air against a spray of molten elemental sulphur in a combustion chamber heated to a temperature sufficiently high to promote a reaction between sulphur and oxygen.

4. The method of producing sulphur dioxide which comprises directing a current of air against a whirling spray of molten elemental sulphur in a combustion chamber heated to a temperature sufficiently high to promote a reaction between sulphur and oxygen.

5. The method of producing sulphur dioxide which comprises directing a whirling current of air against a whirling spray of molten elemental sulphur in a combustion chamber heated to a temperature sufficiently high to promote a reaction between sulphur and oxygen.

6. The method of producing sulphur dioxide which comprises directing a whirling current of air against a stream of molten sulphur to form an intimate mixture of air and finely divided sulphur, the volume of air employed being such that the resulting mixture contains insufficient oxygen to completely oxidize the sulphur to sulphur dioxide, and passing the mixture together with an additional amount of air through a combustion chamber maintained at a temperature sufficiently high to promote a reaction between sulphur and oxygen.

7. The method of producing sulphur dioxide which comprises directing a whirling current of air against a whirling stream of molten sulphur to form an intimate mixture of air and finely divided sulphur, the volume of air employed being such that the resulting mixture contains insufficient oxygen to completely oxidize the sulphur to sulphur dioxide, and passing the mixture together with an additional amount of air through a combustion chamber maintained at a temperature sufficiently high to promote a reaction between sulphur and oxygen.

8. The method of producing sulphur dioxide which comprises directing a whirling current of high-pressure air against a stream of molten sulphur to form an intimate mixture of atomized sulphur and air, the volume of air directed against the stream of sulphur being not substantially greater than that required to atomize the sulphur, and passing the mixture together with additional air at a lower pressure through a combustion chamber maintained at a temperature sufficiently high to promote a reaction between the sulphur and the oxygen of the air.

9. The method of producing sulphur dioxide which comprises directing a whirling current of air at a pressure of about forty to eighty pounds per square inch against a stream of molten sulphur to form an intimate mixture of atomized sulphur and air, the volume of air directed against the stream of sulphur being not substantially greater than that required to atomize the sulphur, and passing the mixture together with additional air at a lower pressure through a combustion chamber maintained at a temperature sufficiently high to promote a reaction between the sulphur and the oxygen of the air.

10. The method of producing sulphur dioxide which comprises directing a whirling current of high-pressure air against a low-pressure stream of molten sulphur to form an intimate mixture of atomized sulphur and air, the volume of air directed against the stream of sulphur being not substantially greater than that required to atomize the sulphur, and passing the mixture together with additional air at a lower pressure through a combustion chamber maintained at a temperature sufficiently high to promote a reaction between the sulphur and the oxygen of the air.

11. The method of producing sulphur dioxide which comprises directing a whirling current of air at a pressure of about forty to eighty pounds per square inch against a low-pressure stream of molten sulphur to form an intimate mixture of atomized sulphur and air, the volume of air directed against the stream of sulphur being not substantially greater than that required to atomize the sulphur, and passing the mixture together with additional air at a lower pressure through a combustion chamber maintained at a temperature sufficiently high to promote a reaction between the sulphur and the oxygen of the air.

12. The method of producing sulphur dioxide which comprises directing a current of high-pressure air against a whirling stream of molten sulphur to form an intimate mixture of atomized sulphur and air, the volume of air directed against the stream of sulphur being not substantially greater than that required to atomize the sulphur, and passing the mixture together with additional air at a lower pressure through a combustion chamber maintained at a temperature sufficiently high to promote a reaction between the sulphur and the oxygen of the air.

13. The method of producing sulphur dioxide which comprises directing a current of air at a pressure of about forty to eighty pounds per square inch against a whirling stream of molten sulphur to form an intimate mixture of atomized sulphur and air, the volume of air directed against the stream of sulphur being not substantially greater than that required to atomize the sulphur, and passing the mixture together with additional air at a lower pressure through a combustion chamber maintained at a temperature sufficiently high to promote a reaction between the sulphur and the oxygen of the air.

14. The method of producing sulphur dioxide which comprises directing a whirling current of gas against a stream of molten sulphur to atomize the sulphur, mixing the atomized sulphur with an oxygen-containing gas, and heating the resulting mixture to a temperature sufficiently high to promote a reaction between sulphur and oxygen.

15. The method of producing sulphur dioxide which comprises directing a whirling current of gas against a whirling stream of molten sulphur to atomize the sulphur, mixing the atomized sulphur with an oxygen-containing gas, and heating the resulting mixture to a temperature sufficiently high to promote a reaction between sulphur and oxygen.

In testimony whereof I affix my signature.

ISAAC BENCOWITZ.